Aug. 23, 1932. R. C. OSTERSTROM ET AL 1,873,783
PROCESS OF TREATING OIL
Filed April 17, 1928
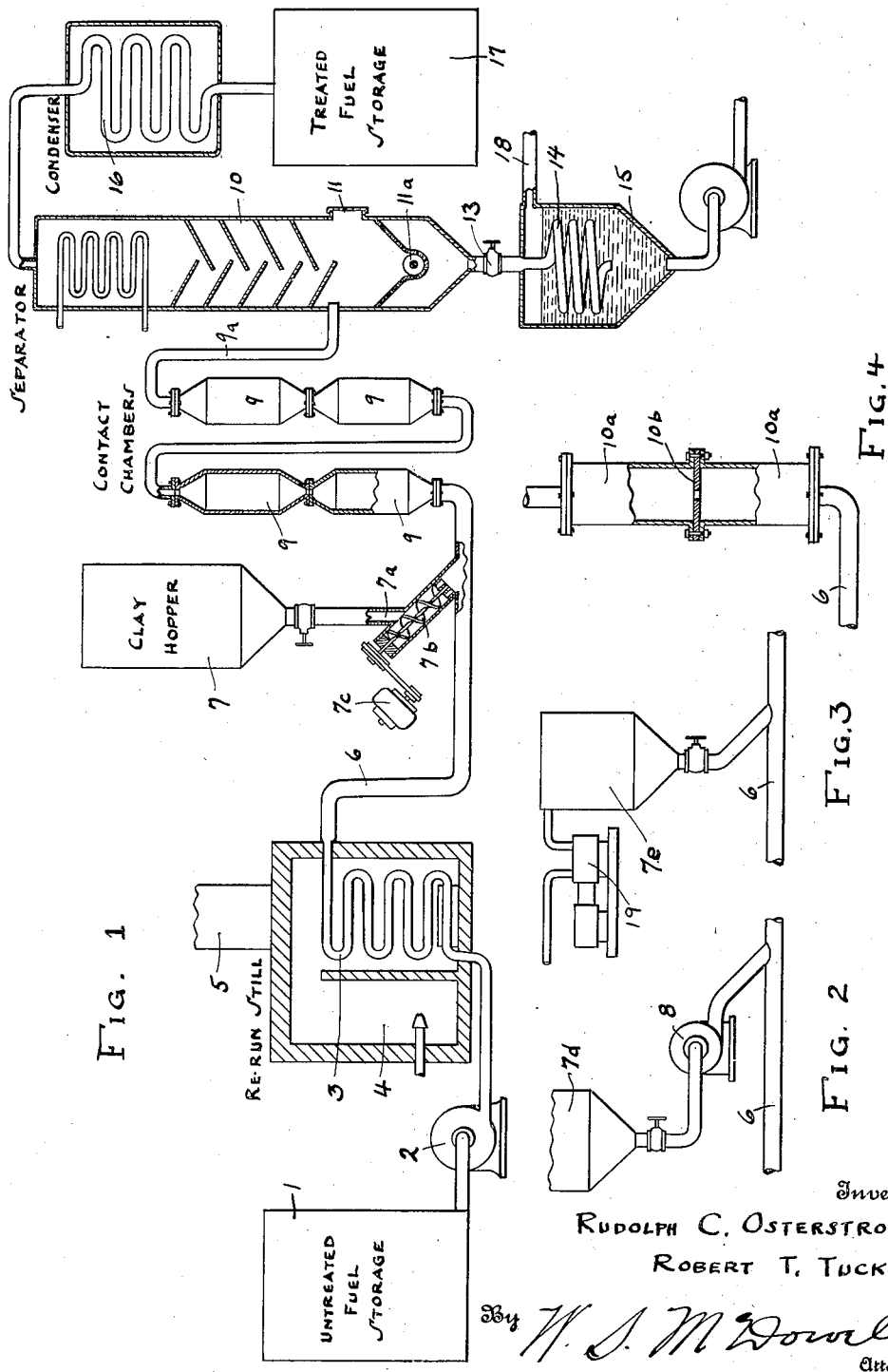
Inventors
RUDOLPH C. OSTERSTROM
ROBERT T. TUCKER
By W. S. McDowell
Attorney Patented Aug. 23, 1932

1,873,783

UNITED STATES PATENT OFFICE

RUDOLPH C. OSTERSTROM, OF CHICAGO, ILLINOIS, AND ROBERT T. TUCKER, OF MUSKOGEE, OKLAHOMA, ASSIGNORS TO THE PURE OIL COMPANY, OF CHICAGO, ILLINOIS, A CORPORATION OF OHIO

PROCESS OF TREATING OIL

Application filed April 17, 1928. Serial No. 270,783.

This invention relates to an improved method of treating relatively low boiling hydrocarbons to render the same suitable for use particularly as motor fuels by removing from such compounds constituents which tend to discolor the same and also any gums which may be present and which would render the final product undesirable as motor fuel.

Among the methods now in use for treating gasoline, naphthas, synthetic motor fuels and other low boiling point hydrocarbons, the following are most generally employed:

The gasoline or other low boiling point hydrocarbon is treated with sulfuric acid, either continually by mixing the liquids with air, mechanical stirrers or both, or in "batch" agitators. The acid sludge from this mixture is allowed to settle, is drawn off and the acid treated gasoline is washed with water and the washed gasoline neutralized with caustic or other neutralizing agents. The gasoline, or other low boiling point hydrocarbon, thus treated is usually dark in color and due probably to the polymerized hydrocarbons formed by the action of the acid, its boiling range is increased so that it is necessary to redistill the gasoline, which results in a product improved in color and other advantageous characteristics.

Another commercial method of treating gasoline and the like to remove color and gum forming compounds is to take the gasoline directly from storage and treat the same at a re-run still and to pass the resulting vapors through a bed of coarse fuller's earth, or other filtering mediums such as charcoal, bone ash, hydrous aluminum silicate and the like, the reactions taking place in the hydrocarbons while the latter are in the vapor phase and in the presence of the fuller's earth, to continually remove from the hydrocarbons the color and gum forming compounds, thus improving the final product and rendering the same suitable for commercial purposes. The hydrocarbon vapor may be led directly from the unit in which it is produced to the bed of coarse fuller's earth or from storage as may be desired. In either case, when the earth is spent or exhausted of its purifying properties, it is necessary to lead the vapors to another treating unit containing a fresh bed of fuller's earth, while the spent clay is being removed from the first tower and a fresh bed of clay or fuller's earth substituted in place thereof.

The present invention offers an improvement over the above commonly used methods in that a method is provided for securing a more intimate contact between the oil vapors and the fuller's earth or other adsorbent, contact or filtering medium utilized, this desirable end being obtained by passing predetermined quantities of finely divided fuller's earth, silica gel or the like into contact with a flowing or moving body of the oil vapors so that complete and effective contact of a greatly improved character can be obtained between the oil under treatment and the filtering or purifying agent, provision being made for controlling the time of reaction or contact and also for separating the purified or refined hydrocarbon compounds from the treating agent.

Further objects of the invention are to provide a method of the above character for treating oil vapor for the purposes stated wherein the apparatus employed is of a simple character and considerably less costly than that employed in connection with comparable systems, and wherein the construction of the apparatus is such as well as the method of operation to allow a greater through-put of oil vapor than in other apparatus of comparable size; to afford a maximum of efficiency from the treating medium and to obtain a product of uniform specifications throughout, together with advantages of a continuous process of operation wherein is included a continual removal of the clay or other treating medium.

A further object is to provide an improved process for refining oils wherein the refining agent is thoroughly distributed throughout all portions of the oil vapor under treatment whereby the refining qualities of the treating materials are utilized to the maximum extent.

A further object is to provide an improved process of refining oils in which the amount of oil which may be refined from a given amount of the refining agent is increased materially over prior practice; or, expressed in other language, in which the amount of refining agent which needs to be used per unit volume of oil under treatment is decreased with respect to prior practices.

Further objects will appear as the description proceeds.

For a further understanding of the invention reference is to be had to the following description and to the accompanying drawing wherein:

Figure 1 indicates diagrammatically the apparatus employed in carrying out the present invention, Figure 2 is a detailed view disclosing a modified method of introducing the treating agent into the oil vapor line, Figure 3 is a similar view of a still further modified form of the invention, and Figure 4 is a view of a modified type of contact vessel.

Referring more particularly to the drawing, the numeral 1 designates a tank in which the gasoline to be treated is stored. This gasoline may have been previously treated by acid or any other conventional means or it may be untreated, such, for example, as when the oil vapors are taken directly from a converting unit.

The gasoline or other low boiling hydrocarbon compound is withdrawn from the tank 1 by way of a pipe line and is forced by a pump 2 into the re-run still 3. This still has been shown, for example, as consisting of rows of tubes heated by hot gases developed in the fire box 4, the hot gases passing out through the stack 5 after they have passed from the oil heating tubes ranged in the furnace setting of the still. The gasoline on leaving the re-run still has been heated above its boiling point and is in a vaporous state. It has been found that the desired temperature for treating varies from 400 to 650° Fah. depending on the composition and boiling range of the materials being handled.

At the heater outlet 6, or in the pipe line leading from such outlet, finely divided fuller's earth, charcoal, bone ash, acid treated clays, silica gel, bentonite, diatomaceous earths or other filtering mediums, are introduced into the vapor line as a finely divided body or powder from the clay line 7a. The clay line consists of a hopper or magazine 7 adapted to contain a suitable quantity of the finely divided fuller's earth, or other treating medium. This earth is in a finer state of subdivision than is ordinarily employed in analogous refining operations, wherein a comparatively coarse grade of clay is utilized. It has been found that the present invention operates to greater advantage with the extremely finely divided materials, than with the coarser materials, for reasons which will be apparent as the description proceeds. Leading from the hopper or magazine is the pipe line 7a, in which is located a conveyor screw 7b, the latter being driven by, for example, a variable speed electric motor 7c. When the motor 7c is in operation, the screw 7b is rotated at a predetermined rate of speed so as to discharge a predetermined quantity of the clay into the vapor line 6.

This operation may be accomplished in other ways and, for example, in Figure 2 there has been shown a reservoir 7d adapted to contain a concentrated mixture of fuller's earth in water, gasoline or heavy oil, and a pump 8 is utilized to withdraw this mixture from the reservoir 7d and to discharge the same into the vapor pipe line 6. A third form of effecting the introduction of the treating material into engagement with the oil vapor is to provide the blow-case 7e, illustrated in Figure 3, in which pressure is maintained by means of a compressor 19, so as to force the contact of treating material into the vapor line 6, the outlet of the case being provided with a suitable valve for regulating the flow of the treating materials, which latter may be in the form of a powder or a liquid. The methods of applying the treating agent above described may be used selectively or in combination, as desired.

After the treating agent has been added the mixture of gasoline vapors and treating agent are passed through vessels 9 formed to include contact chambers. One or more of such vessels may be utilized, the size and number depending on the amount of gasoline to be treated per unit of time and the amount of the refining agent required. The contact chambers provided in the vessels 9 are formed to include conical tops and bottoms, so that the mixture of vapors and fuller's earth will enter at the bottom of each chamber and pass out at the top. It is in these chambers that the treating effect or action of the fuller's earth is obtained. The natural tendency of the clay is to settle or fall and the force of the vapors passing through give a maximum amount of contact and treating efficiency, it being desirable to construct the chambers of such size that the ratio of fuller's earth to gasoline vapors is much greater in these chambers than in the vapor line 9a leaving the chambers. These treating chambers are also built or made of such size and number that the desired time element will be obtained, as the polymerization of the undesirable color and gum forming compounds, such as tertiary and diolefines, is a reaction requiring time for execution. It has been found necessary in some cases to hold the time of contact as high as 60 minutes, while in other cases complete removal of the undesirable compounds is obtained in five minutes or less. The polymerization taking place in the contact chambers is an exothermal reaction, the rise in temperature in some cases being 235° Fah. This heat of reaction prevents any possibility of cooling of the oil vapors in the contact chambers and, therefore, insures complete vapor phase treatment.

After leaving the contact chambers 9 the mixture of gasoline vapors and fuller's earth passes into a separator 10 by way of the pipe line 9a provided with a valve 19. This separator is in the form of an evaporator or tower, wherein the clay is allowed to fall to the bottom of the separator and the vapors pass on out of the separator through its top. It is preferable to regulate the temperature of the outlet of the separator at its top to maintain such temperature constant, so that the oil vapors will be fractionated to the desired boiling range. Any automatic means for accomplishing this may be utilized. Suitable means can be provided for removing the spent clay from the bottom of the separator, such as a manhead 11, which can be placed on one side of the separator or a mechanical means for continuous removal, such as the screw conveyor 11a.

While there has been specifically described a particular type of contact vessel which may be used in carrying out the invention, nevertheless it may be understood that other types of vessels may also be utilized. For example, as shown in Figure 4, pipe sections 10a may be employed, flanged on both ends with orifice plate 10b inserted between each pipe section. Again, the mixing may be secured by means of an ordinary cylinder with sufficient obstructions in the form of baffle plates or similar devices placed in the cylinder so that a violent swirling action will take place, providing the contact which is desired.

The polymer fraction that has been formed in the contact vessels and which has a higher boiling range than the desired gasoline, condenses and becomes a liquid at the temperature which is maintained in the separator 10, and this condensate drops to the bottom of the separator with the clay. The clay-polymerized hydrocarbon mixture is then allowed to drop out of the bottom of the separator by opening a valve 13, the extent of the opening determining the rapidity of the removal of the liquid clay mixture. Passing through this valve the mixture might be further cooled by a coil 14, which opens into a sump 15. This sump is a tank with a pitched bottom, almost completely filled with water. On being released into this water, the clay and heavy tarry matter settle to the bottom, while the lighter fractions of the oil entrained with the clay rise to the top of the water, where such lighter fractions can be continually removed by overflowing through the pipe line 18 into storage, or may be pumped from the top of the water surface. The clay and heavy tar mixture is removed from the bottom of the sump 15 by means of a pump probably of the sandhog variety, and directed to any desired point. The vapors removed from the top of the separator, as treated gasoline, are cooled by means of a coil 16 and then directed to a storage tank 17. The system operates substantially at atmospheric pressure throughout.

The finished gasolines from the above process are of good color, odor and of low gum content, but in some cases in order to get a finished product, sweet to the doctor test, this has been accomplished by the addition of a small amount of lead oxide to the fuller's earth in the hoppers or magazines 7, the mixture being fed into the vapor line 6. The amount of lead oxide required varies from 0.005 to 0.04 percent by weight of gasoline treated. The action of the lead oxide removes most of the sulfur and mercaptans contained in gasoline by the formation of lead sulphide, the latter being removed along with the clay.

Advantages of the above method are manifold. First, the system allows the use of a very finely ground fuller's earth, which has the advantage of greater surface area over the coarser grades of clay which are used in percolation methods, the polymerizing or decolorizing action of the earth being dependent upon this surface area. Due to the greater increase in surface area of the finer clay and its increased efficiency there is a saving in the amount of clay required to obtain a certain color over the coarser clays per unit amount of gasoline treated. Further, by treating in the vapor phase an increased efficiency is obtained over treating in the liquid phase, which is also a factor in reducing the amount of treating agent required. In other words, the above process allows the use of a clay in such form that its greatest efficiency is obtained, and at the same time applying the clay on gasoline which is in such a condition that it is most easily affected by the treating agent. Another advantage of the above method is that all of the gasoline is treated to a uniform color, and is not a mixture of low and high color products, such as is obtained by percolating the vapors through a stationary bed of clay. A further feature of the invention is the continuous removal of the spent clay from the separating zone and in so regulating the operation of the process that by the time all the clay-polymerized hydrocarbon is treated in the zone where separation of the clay takes place, the clay is in a spent condition. This feature permits of the use of a means for continuous removal of the spent clay, making the clay treating process a continuous operation instead of a batch operation, as heretofore. Still, another advantage is that this method permits of a continuous introduction of lead oxide or other chemical so that the final product obtained will be negative to a doctor test reaction, giving a sweet, stable product at the same time that it is being decolorized and the undesirable hydrocarbons are being polymerized.

What is claimed is:

1. The method of removing gum forming and color imparting bodies from petroleum products containing unsaturated compounds, which comprises introducing comminuted solid adsorptive material into a flowing stream of such products in vapor phase, causing the treating material to remain suspended in the vapor for a sufficient length of time to exert the desired effect, subsequently directing the vapor stream upwardly and directing a stream of liquid hydrocarbons counter-current to the vapor stream to effect removal of high boiling constituents, together with polymers and adsorptive material.

2. The method of removing gum-forming and color-imparting bodies from petroleum products containing unsaturated compounds, which comprises introducing comminuted solid adsorptive material into a flowing stream of such products in vapor phase, causing the treating material to remain suspended in the vapor for a sufficient length of time to exert the desired effect, subsequently retarding the rate of flow of the vapor stream to effect separation therefrom of polymers and adsorptive material, while directing the vapor stream substantially upwardly and passing liquid hydrocarbons counter-current to the vapor stream when its flow is so retarded to effect removal of high boiling constituents together with polymers and adsorptive material.

3. The continuous method of degumming cracked hydrocarbon oils with adsorptive material which comprises heating a confined stream composed solely of the oil to be treated to vaporizing temperature to convert such oil to vapor, introducing into the stream of vapor finely divided solid adsorptive material, maintaining the vapor and adsorptive material in intimate contact for sufficient time to exert the desired effect, subsequently directing the vapor stream upwardly and directing a stream of liquid hydrocarbons counter-current to the vapor stream to effect removal of high boiling constituents, together with polymers and adsorptive material.

4. The continuous method of removing gum-forming and color-imparting bodies from cracked hydrocarbon oils with adsorptive material which comprises heating a confined stream composed solely of the oil to be treated to vaporizing temperature to convert such oil to vapor, introducing into the stream of vapor finely divided solid adsorptive material, maintaining the vapor and adsorptive material in intimate contact for sufficient time to exert the desired effect, subsequently retarding the rate of flow of the vapor stream to effect separation therefrom of polymers and adsorptive material, directly the vapor stream upwardly and directing a stream of liquid hydrocarbons counter-current to the vapor stream to effect removal of high boiling constituents together with polymers and adsorptive material.

5. The method of removing gum-forming compounds from cracked petroleum oils containing unsaturated compounds, which comprises passing a confined flow stream composed of such oils at a temperature sufficiently high to maintain the oil substantially in the vapor phase but without appreciable cracking thereof together with a comminuted solid adsorptive material suspended in the oil vapor through an elongated treating zone, retaining the flowing stream of mixed oil vapor and adsorptive material in said treating zone for a sufficient length of time to polymerize gum-forming constituents present in said oil vapors, subsequently retarding the rate of flow of the vapor stream to effect separation therefrom of polymers and adsorptive material while directing the vapor stream substantially upwardly, and passing liquid hydrocarbons in countercurrent flow relative to the vapor stream when its flow is so retarded to effect removal of high boiling constituents together with polymers and adsorptive material.

6. The continuous method of removing gum-forming and color-imparting bodies from cracked petroleum oils containing unsaturated compounds, which comprises heating such oils while the latter are passing in a confined continuously flowing elongated stream of restricted cross sectional area to temperatures sufficiently high to effect substantially complete vaporization of the oils without material cracking thereof, discontinuing the heating of the oils after the latter attain the desired temperatures and vapor state and without interrupting the flow thereof passing the same through an elongated treating zone of restricted cross sectional area, introducing into the vapor stream passing through said treating zone a comminuted solid adsorptive material and causing the treating material to remain suspended in the vapor stream for a sufficient length of time to exert the desired effect, subsequently retarding the rate of flow of the vapor stream to effect separation therefrom of polymers and adsorptive material while directing the vapor stream substantially upwardly, and passing liquid hydrocarbons counter-current to the vapor stream while its flow is so retarded to effect removal of high boiling constituents together with polymers and adsorptive material.

7. The method of removing gum-forming and color-imparting bodies from cracked petroleum oils containing unsaturated compounds, which comprises heating such oils while the latter are passing in a confined continuously flowing elongated stream of restricted cross sectional area to temperatures above those necessary to vaporize the oils but insufficient to effect any substantial cracking thereof, discontinuing the heating of the oils after the latter reach the desired temperature and state of vapor and passing the same continuously through an elongated treating zone, introducing into the stream of such vaporized oils during passage thereof through the treating zone regulated quantities of a comminuted solid adsorptive treating material, said treating material being suspended in said vapors and carried thereby through the treating zone, producing intimate contact between the vaporized oils and treating material during passage thereof through the treating zone while maintaining their sustained flow by repeated expanding and contracting of the cross sectional area of said stream, subsequently retarding the rate of flow of the vapor stream to effect separation therefrom of polymers and adsorptive material, directing the vapor stream substantially upwardly and directing a stream of liquid hydrocarbons counter-current to the upwardly moving vapors to effect removal of high boiling constituents present therein together with polymers and adsorptive material.

In testimony whereof we affix our signatures.

RUDOLPH C. OSTERSTROM.
ROBERT T. TUCKER.